United States Patent
Daniels et al.

(10) Patent No.: US 8,317,462 B2
(45) Date of Patent: Nov. 27, 2012

(54) SYSTEM FOR ACTIVELY MONITORING WEAR ON WIND TURBINE BRAKE PADS AND RELATED METHODS

(75) Inventors: Jeffrey Michael Daniels, Schenectady, NY (US); Ulrich Neumann, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/094,215

(22) Filed: Apr. 26, 2011

(65) Prior Publication Data
US 2012/0027585 A1 Feb. 2, 2012

(51) Int. Cl.
*F01D 15/12* (2006.01)
(52) U.S. Cl. ........................................ 415/123; 415/118
(58) Field of Classification Search .............. 415/1, 123, 415/118; 188/1.11 W, 1.11 L, 71.7, 71.8, 188/79.51
See application file for complete search history.

(56) References Cited

U.S. PATENT DOCUMENTS

| | | | |
|---|---|---|---|
| 4,013,143 A | 3/1977 | Juhasz | |
| 7,108,107 B2 * | 9/2006 | Ralea et al. | 188/1.11 L |
| 7,322,794 B2 * | 1/2008 | LeMieux et al. | 416/40 |
| 7,436,083 B2 * | 10/2008 | Shibata et al. | 290/44 |
| 2009/0205910 A1 * | 8/2009 | Cahill | 188/1.11 L |
| 2009/0229926 A1 * | 9/2009 | Schaefer | 188/1.11 L |
| 2010/0038191 A1 * | 2/2010 | Culbertson et al. | 188/72.6 |
| 2010/0209246 A1 * | 8/2010 | Migliori | 416/1 |

FOREIGN PATENT DOCUMENTS

DE 102008011148 A1 * 10/2009

* cited by examiner

*Primary Examiner* — Edward Look
*Assistant Examiner* — Adam W Brown
(74) *Attorney, Agent, or Firm* — Dority & Manning, P.A.

(57) ABSTRACT

A system for monitoring wear on a brake pad of a wind turbine is disclosed. The system may include a brake assembly having a brake pad and a moveable component. The brake pad may be configured to engage a friction surface of the wind turbine. The movable component may be configured to move relative to the friction surface as the brake pad wears. Additionally, the system may include a sensor at least partially mounted within the brake assembly. The sensor may be configured to detect a position of the movable component relative to the sensor or a position of the friction surface relative to the sensor.

9 Claims, 8 Drawing Sheets

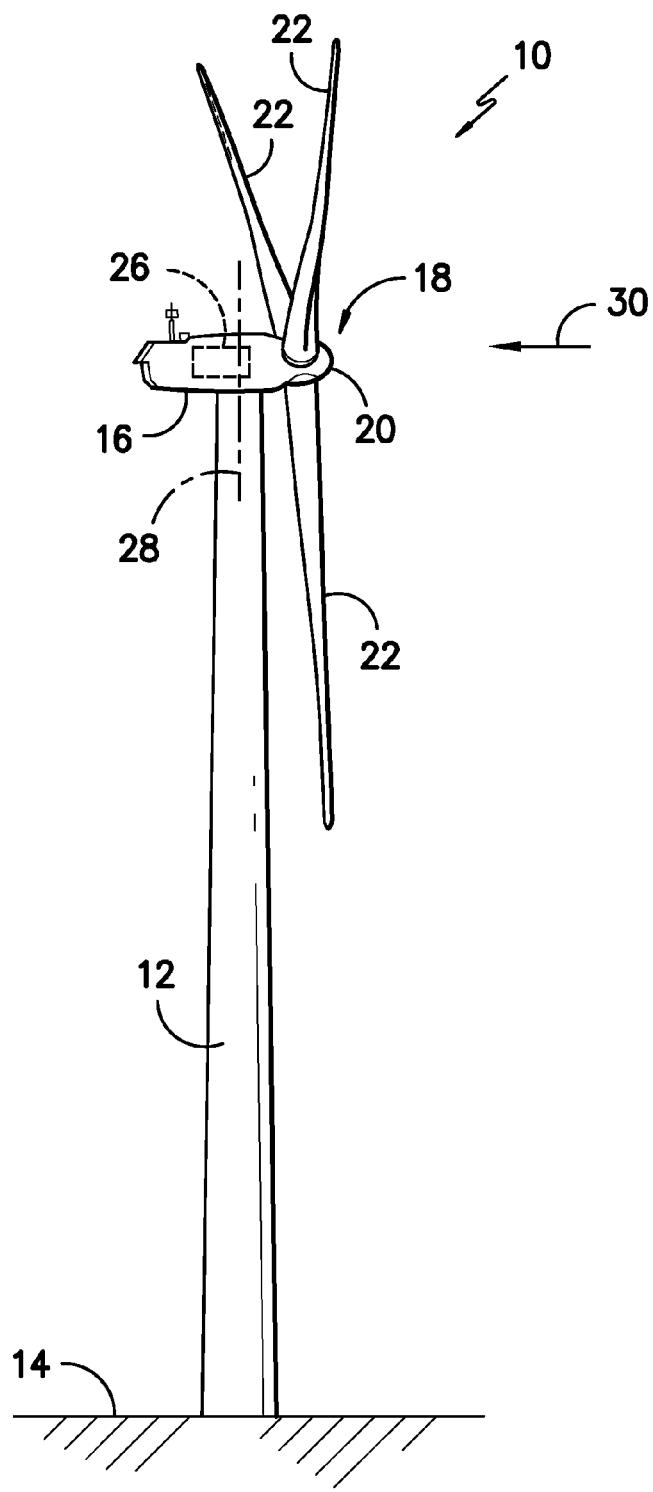
FIG. -1-

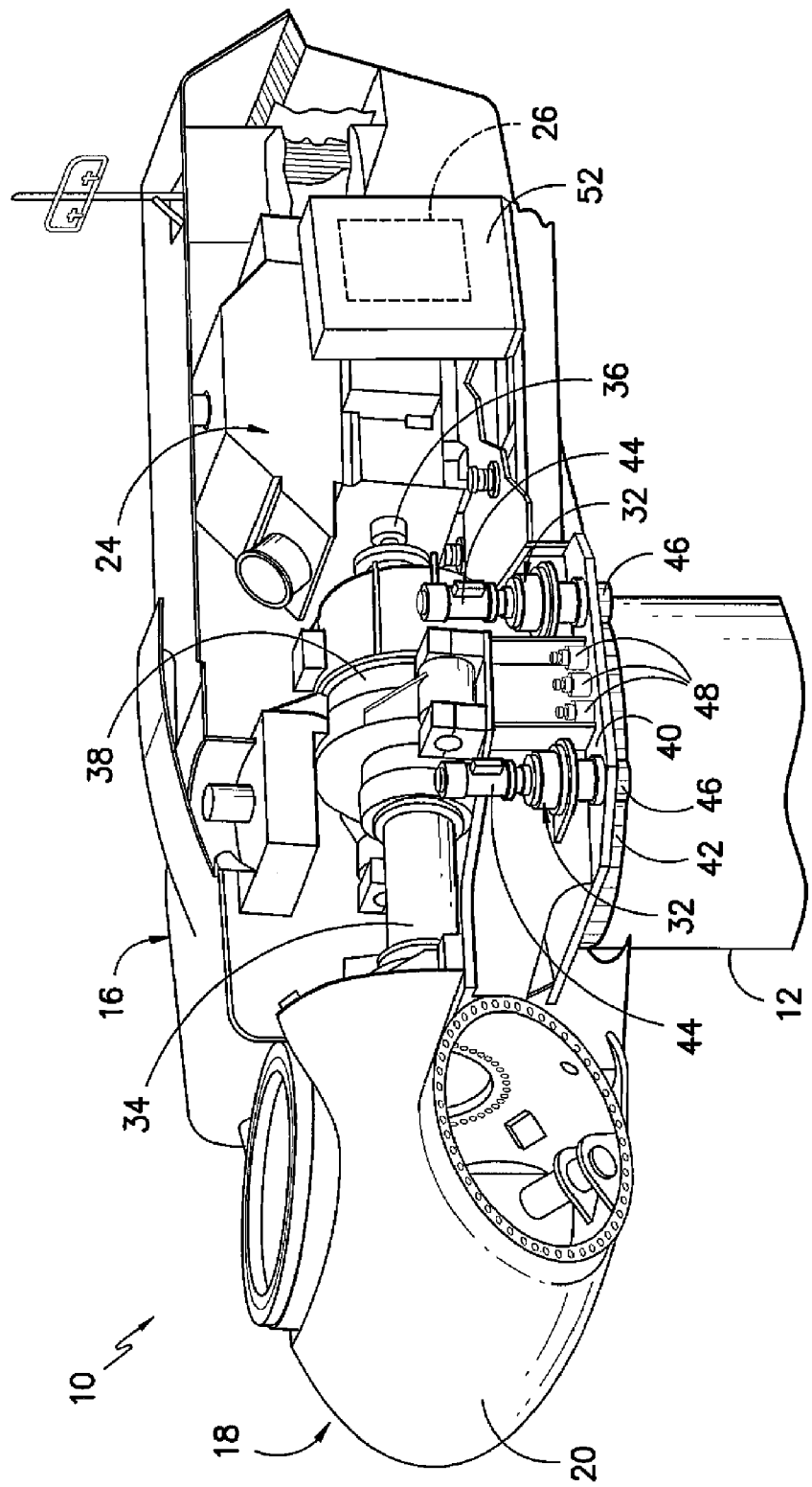
FIG. -2-

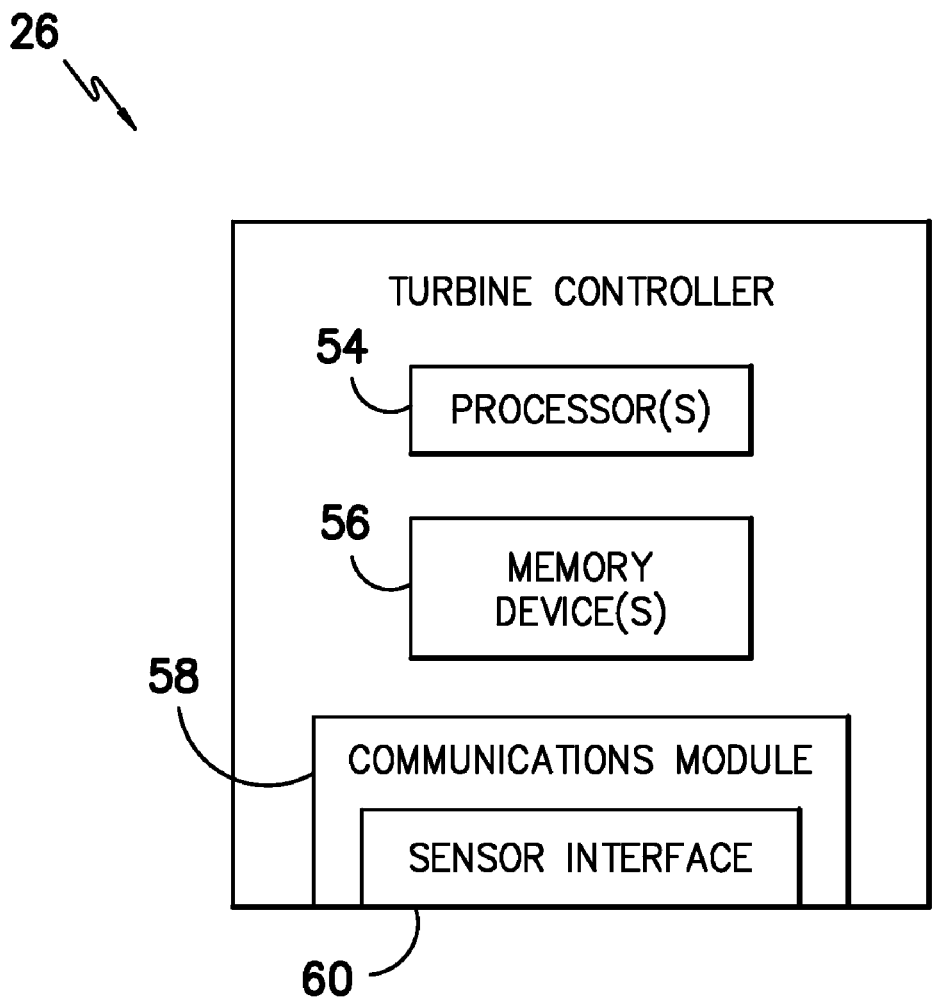
FIG. -3-

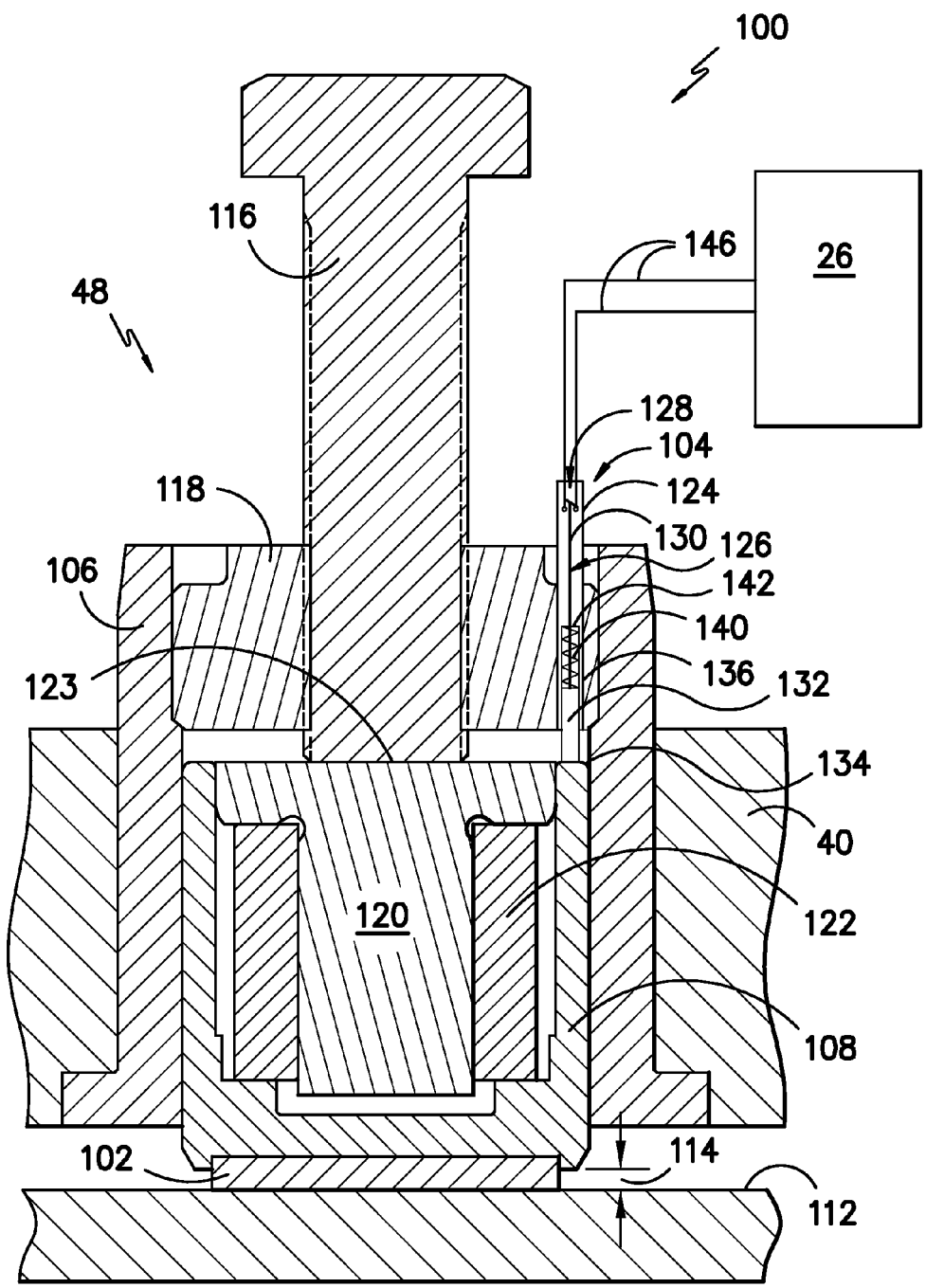
FIG. —4—

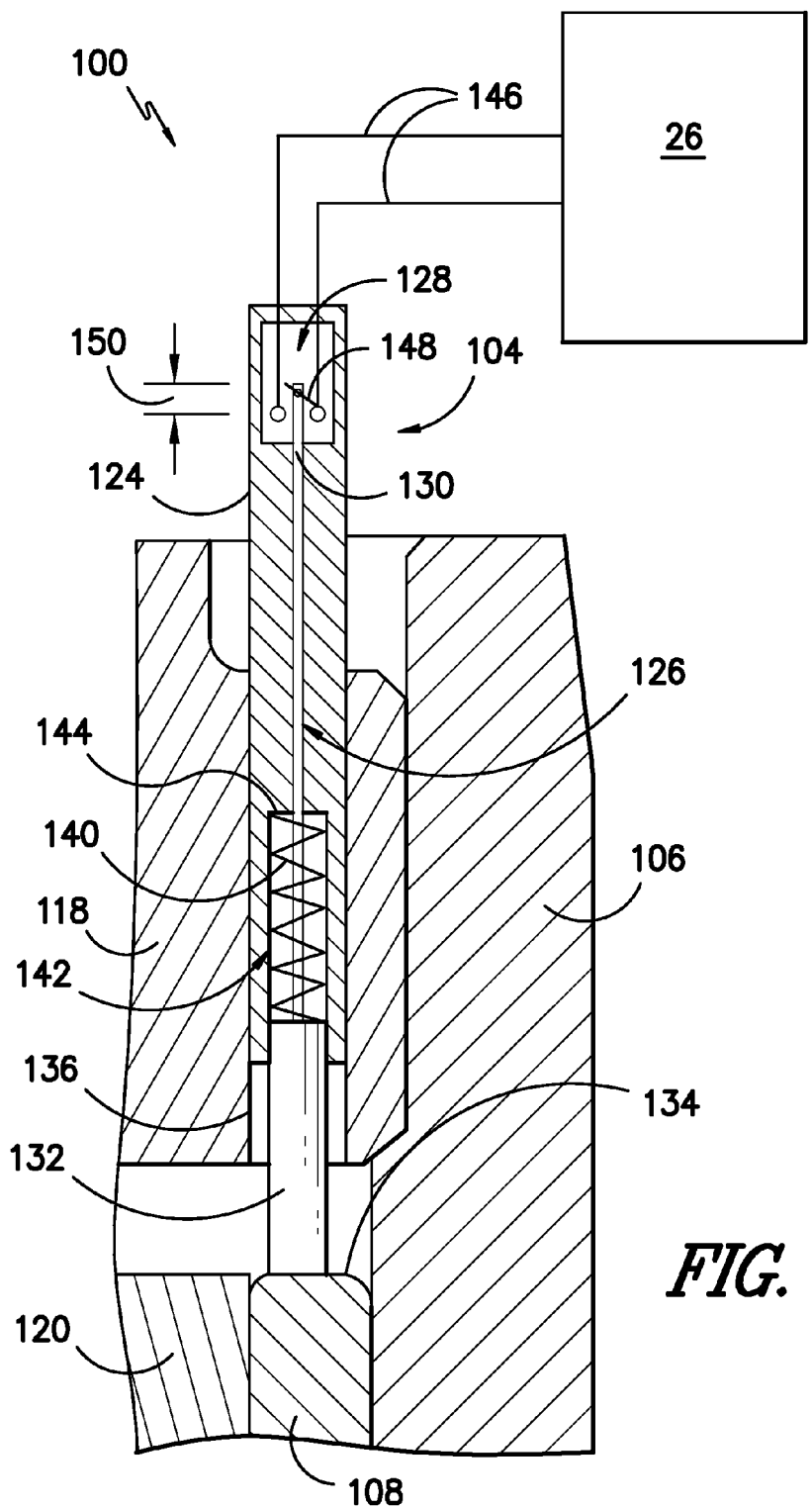
FIG. -5-

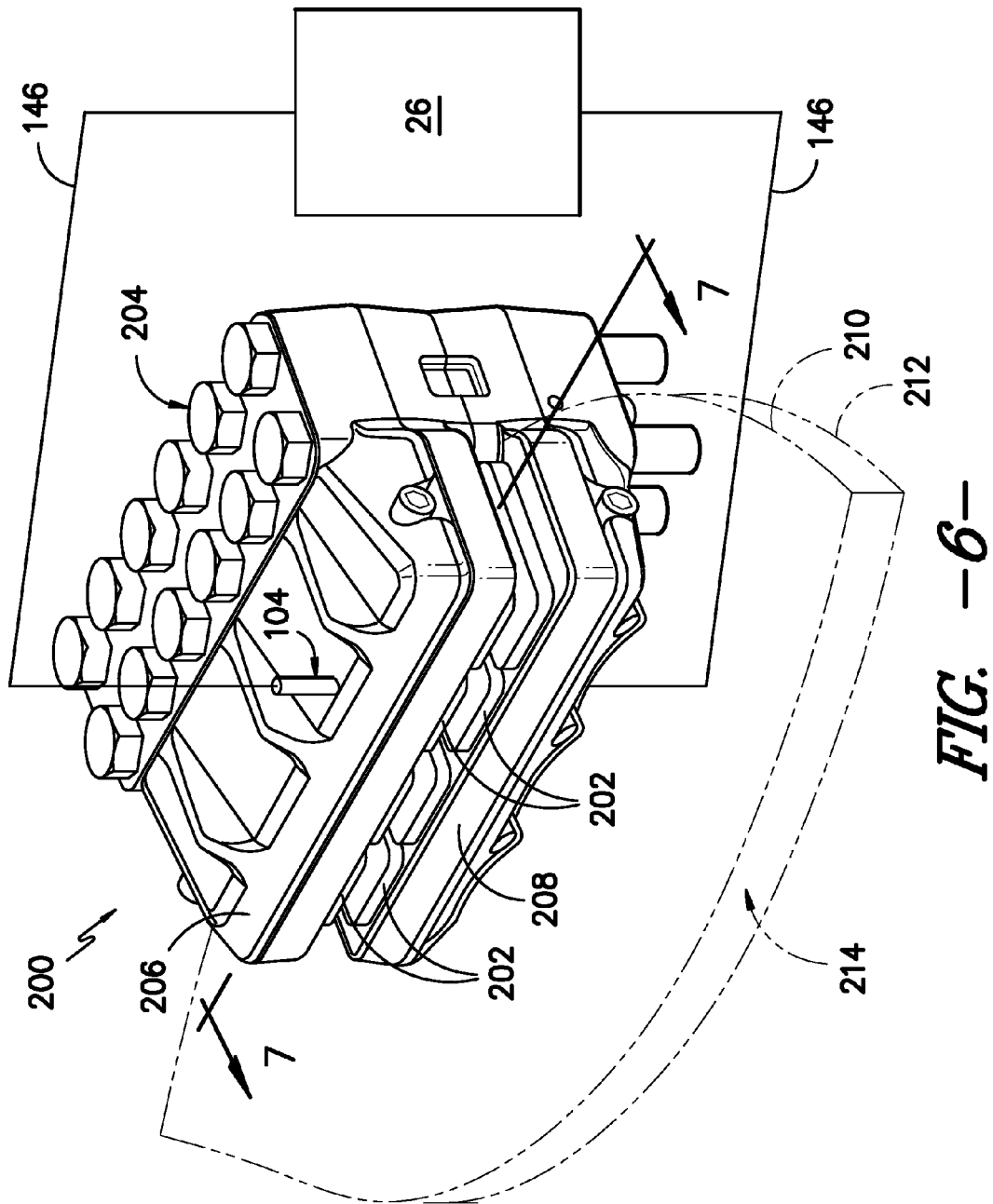
FIG. -6-

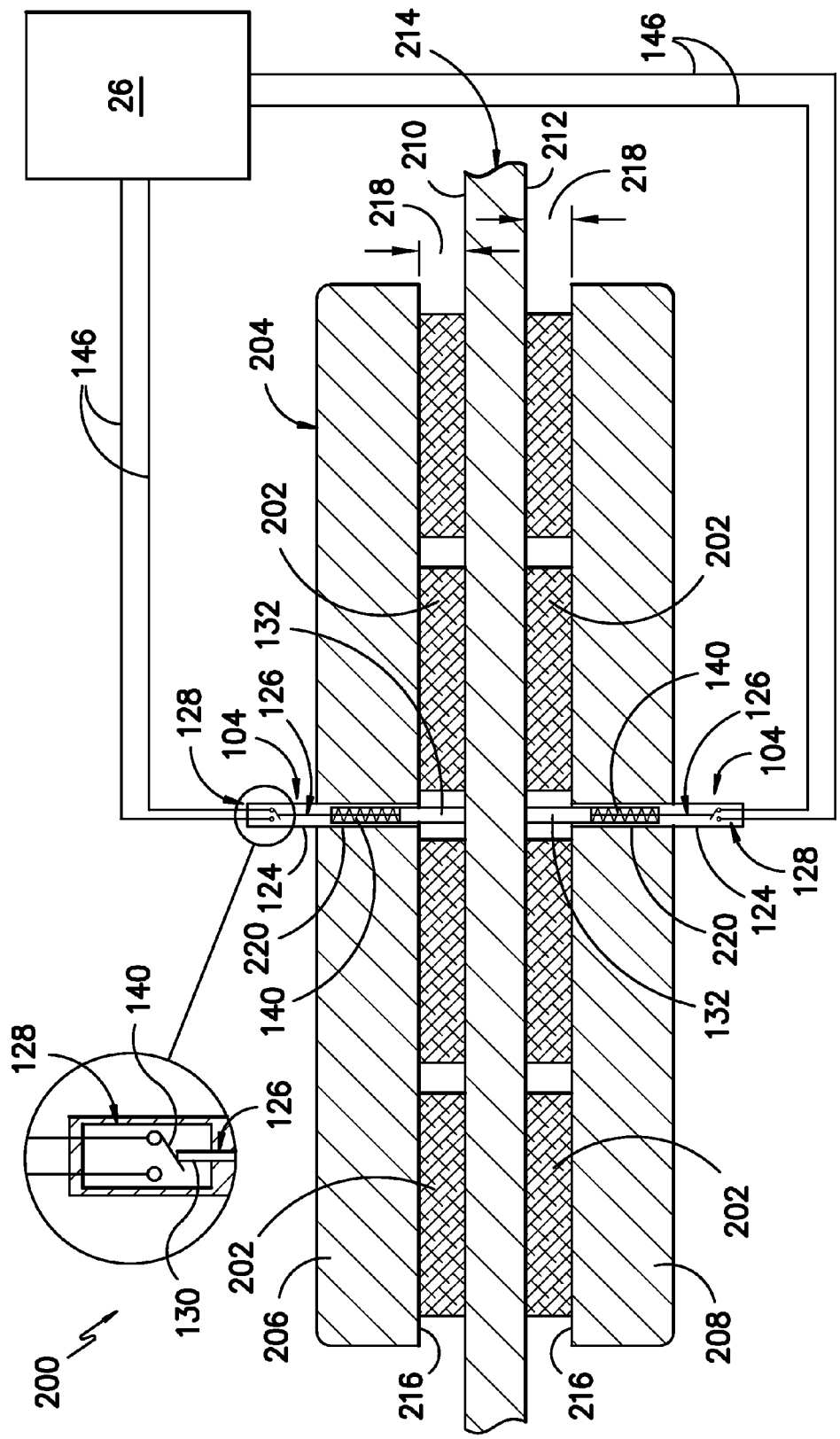
FIG. -7-

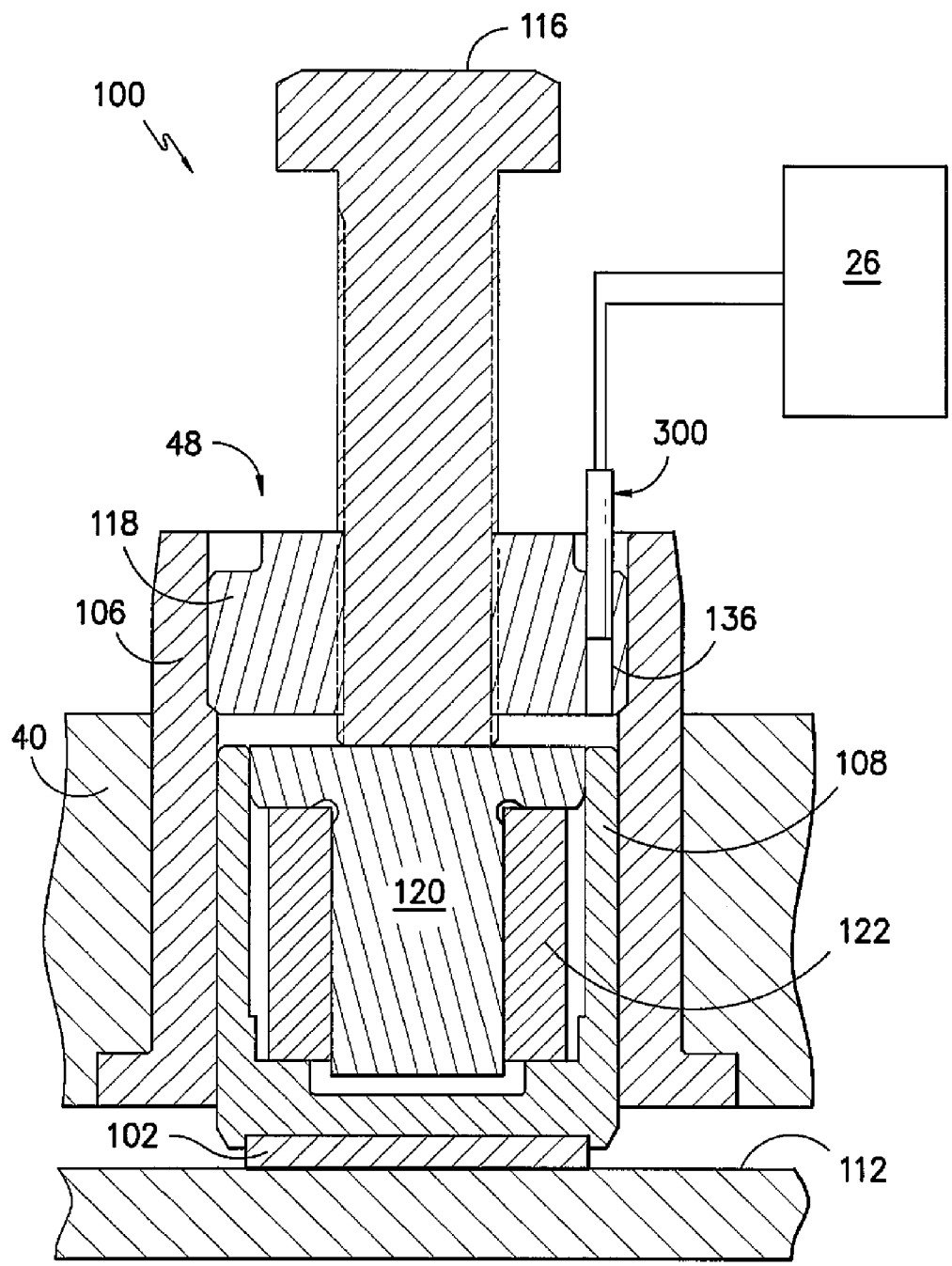
FIG. -8-

SYSTEM FOR ACTIVELY MONITORING WEAR ON WIND TURBINE BRAKE PADS AND RELATED METHODS

FIELD OF THE INVENTION

The present subject matter relates generally to braking systems for wind turbines and, more particularly, to a system and method for actively monitoring wear on a brake pad of a wind turbine.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

To properly orient the rotor blades relative to the direction of the wind, wind turbines typically include one or more yaw drive mechanisms configured to engage a yaw bearing for rotating the nacelle relative to the tower. Additionally, to control such rotation, a wind turbine may include one or more yaw brake assemblies having brake pads configured to frictionally engage the yaw bearing. Due to the frictional sliding between the brake pads and the yaw bearing, the pads generally wear over time. Thus, it is necessary to periodically inspect the yaw brake assemblies of the wind turbine to determine whether any or all of the brake pads need to be replaced.

Current brake pad inspection methods require that a maintenance worker climb the wind turbine and either perform manual measurements of the brake pads or disassemble the brake assemblies to allow for visual inspection of the brake pads. Unfortunately, this inspection method is very expensive and time consuming. Additionally, since the inspection method requires that the wind turbine be shutdown, such inspections are typically performed only at normal maintenance intervals. Thus, wear issues occurring between the maintenance intervals go unnoticed, which can lead to significant damage to the wind turbine brake system.

Accordingly, a system for actively monitoring wear on a brake pad of a wind turbine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a system for monitoring wear on a brake pad of a wind turbine. The system may include a brake assembly having a brake pad and a moveable component. The brake pad may be configured to engage a friction surface of the wind turbine. The movable component may be configured to move relative to the friction surface as the brake pad wears. Additionally, the system may include a monitoring device. The monitoring device may include a housing mounted at least partially within the brake assembly and a rod extending outwardly from the housing. The rod may be disposed relative to the movable component or the friction surface such that a position of the rod changes as the brake pad wears. The monitoring device may also include a sensor configured to detect changes in the position of the rod.

In another aspect, the present subject matter discloses a system for monitoring wear on a brake pad of a wind turbine. The system may include a brake assembly having a brake pad and a moveable component. The brake pad may be configured to engage a friction surface of the wind turbine. The movable component may be configured to move relative to the friction surface as the brake pad wears. Additionally, the system may include a sensor at least partially mounted within the brake assembly. The sensor may be configured to detect a position of the movable component relative to the sensor or a position of the friction surface relative to the sensor.

In a further aspect, the present subject matter discloses a method for actively monitoring wear on a brake pad of a wind turbine. The method may include electrically receiving a signal related to an amount of wear that has occurred on the brake pad of a brake assembly of the wind turbine and electrically generating a message signal based on the amount of wear that has occurred on the brake pad.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective, interior view of one embodiment of a nacelle of the wind turbine shown in FIG. 1;

FIG. 3 illustrates a schematic diagram of one embodiment of a turbine controller of a wind turbine in accordance with aspects of the present subject matter;

FIG. 4 illustrates a cross-sectional view of one embodiment of a system for actively monitoring wear on a brake pad of a wind turbine in accordance with aspects of the present subject matter, particularly illustrating embodiments of a brake assembly and a monitoring device of the system;

FIG. 5 illustrates a close-up, cross-sectional view of the monitoring device shown in FIG. 4;

FIG. 6 illustrates a perspective view of another embodiment of a system for actively monitoring wear on a brake pad of a wind turbine in accordance with aspects of the present subject matter, particularly illustrating embodiments of a brake assembly and monitoring devices of the system;

FIG. 7 illustrates a cross-sectional view of the brake assembly and monitoring devices shown in FIG. 6 taken along line 7-7; and, FIG. 8 illustrates a cross-sectional view of another embodiment of the system shown in FIG. 4.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system for actively monitoring wear on a brake pad of a brake assembly of a wind turbine. For example, in several embodiments, the system may include a monitoring device configured to detect brake pad wear by sensing relative position changes and/or relative displacements between components of the brake assembly, components of the monitoring device and/or a friction surface of the wind turbine. Signals associated with the relative position changes and/or relative displacements may then be transmitted to a turbine controller of the wind turbine. The turbine controller may analyze the signals and generate suitable message signals to indicate when the brake pads need to be replaced and/or when the yaw brake assembly needs to be serviced.

Referring now to the drawings, FIG. 1 illustrates perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or turbine controller 26 centralized within the nacelle 16. However, it should be appreciated that the turbine controller 26 may be disposed at any location on or in the wind turbine 10, at any location on the support surface 14 or generally at any other location. As will be described below with reference to FIG. 3, the turbine controller 26 may generally comprise as any suitable processing unit configured to perform the functions described herein. Thus, in several embodiments, the turbine controller 26 may include suitable computer-readable instructions that, when implemented, configure the controller 26 perform various different actions, such as transmitting and executing wind turbine control signals, receiving and analyzing sensor signals and generating message signals to provide an indication of the wear occurring on any brake pads of the wind turbine 10.

By transmitting and executing wind turbine control signals, the turbine controller 26 may generally be configured to control the various operating modes (e.g., start-up or shut-down sequences) and/or components of the wind turbine 10. For example, the controller 26 may be configured to control the yaw direction of the nacelle 16 about a yaw axis 28 to position the rotor blades 22 with respect to the direction 30 of the wind, thereby controlling the load and power output generated by the wind turbine 10. For example, as will be described below, the turbine controller 26 may be configured to transmit control signals/commands to one or more yaw drive mechanisms 32 (FIG. 2) of the wind turbine 10 such that the nacelle 16 may be rotated about the yaw axis 28.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a rotor shaft 34 coupled to the hub 20 for rotation therewith. The generator 24 may then be coupled to the rotor shaft 34 such that rotation of the rotor shaft 34 drives the generator 24. For instance, in the illustrated embodiment, the generator 24 includes a generator shaft 36 rotatably coupled to the rotor shaft 34 through a gearbox 38. However, in other embodiments, it should be appreciated that the generator shaft 36 may be rotatably coupled directly to the rotor shaft 34. Alternatively, the generator 24 may be directly rotatably coupled to the rotor shaft 34 (often referred to as a "direct-drive wind turbine").

Additionally, the wind turbine 10 may include one or more yaw drive mechanisms 32 mounted to and/or through a bed-plate 40 positioned atop the wind turbine tower 12. Specifically, each yaw drive mechanism 32 may be mounted to and/or through the bedplate 40 so as to engage a yaw bearing 42 (also referred to as a slewring or tower ring gear) of the wind turbine 10. The yaw bearing 42 may be mounted to the bed plate 40 such that, as the yaw bearing 42 rotates about the yaw axis 28, the bedplate 40 and, thus, the nacelle 16 are similarly rotated about the yaw axis 28.

In general, it should be appreciated that the yaw drive mechanisms 32 may have any suitable configuration and may include any suitable components known in the art that allow such mechanisms 32 to function as described herein. For example, as shown in FIG. 2, each yaw drive mechanism 32 may include a yaw motor 44 mounted to the bedplate 40. The yaw motor 44 may be coupled to a yaw gear 46 (e.g., a pinion gear) configured to engage the yaw bearing 42. For instance, the yaw motor 44 may be coupled to the yaw gear 46 directly (e.g., by an output shaft (not shown) extending through the bedplate 40) or indirectly through a suitable gear assembly coupled between the yaw motor 44 and the yaw gear 46. As such, the torque generated by the yaw motor 44 may be transmitted through the yaw gear 46 and applied to the yaw bearing 42 to permit the nacelle 16 to be rotated about the yaw axis 28. It should be appreciated that, although the illustrated wind turbine 10 is shown as including two yaw drive mechanisms 32, the wind turbine 10 may generally include any suitable number of yaw drive mechanisms 32, such as a single yaw drive mechanism 32 or more than two yaw drive mechanisms 32.

Referring still to FIG. 2, the wind turbine 10 may also include a plurality of brake assemblies 48 for controlling the rotation of the nacelle 16 about the yaw axis 28. For example, as shown in the illustrated embodiment, the brake assemblies 48 may be mounted to and/or through the bedplate 40 such that a brake pad 102 (FIG. 4) of each brake assembly 48 is frictionally engaged with a suitable friction surface of the wind turbine 10 (e.g., a surface of the yaw bearing 42) in order to stop, slow and/or otherwise control the rotation of the nacelle 16. It should be appreciated that the wind turbine 10 may generally include any suitable number of yaw brake assemblies 48. For instance, in one embodiment, the wind turbine 10 may include between twelve and twenty yaw brake assemblies 48. However, in other embodiments, the wind turbine 10 may include less than twelve yaw brake assemblies 48 or greater than twenty yaw brake assemblies 48.

Additionally, as indicated above, the turbine controller 26 may also be located within the nacelle 16. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described above, the turbine controller 26 may also be communicatively coupled to various components of the wind turbine 10 for generally controlling the wind turbine 10 and/or such components. For example, the turbine controller 26 may be communicatively coupled to the yaw drive mechanisms 32 such that suitable control signals may be transmitted to the yaw drive mechanisms 32 to allow the rotation of the nacelle 16 and the orientation of the rotor blades 22 to be controlled.

Referring now to FIG. 3, there is illustrated a block diagram of one embodiment of the turbine controller 26 of the wind turbine 10. In general, the turbine controller 26 may comprise a computer or any other suitable processing unit. Thus, in several embodiments, the turbine controller 26 may include one or more processor(s) 54 and associated memory device(s) 56 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 56 of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 56 may generally be configured to store suitable computer-readable instructions that, when implemented by the processor(s) 54, configure the turbine controller 26 to perform various functions including, but not limited to, monitoring wear occurring on the brake pads 102 (FIG. 4) of the wind turbine 10, generating message signals associated with the brake pad wear and/or the like. The memory device(s) 56 may also be used to store temporary input and output variables and other immediate information during execution by the processor(s) 54 of the computer-readable instructions.

Additionally, as shown in FIG. 3, the turbine controller 26 may also include a communications module 58 configured to facilitate communication between the turbine controller 26 and the various components of the wind turbine 10. In several embodiments, the communications module 58 may include a sensor interface 60 to permit any sensors 128, 300 (FIGS. 4, 5, 7 and 8) of the wind turbine 10 to communicate with the turbine controller 26. For instance, the sensor interface 60 may comprise one or more analog-to-digital converters configured to convert analog signals into digital signals that can be used by the processor(s) 54.

Referring now to FIGS. 4 and 5, one embodiment of a system 100 for actively monitoring wear on a brake pad 102 of a yaw brake assembly 48 of the wind turbine 10 is illustrated in accordance with aspects of the present subject matter. In particular, FIG. 4 illustrates a cross-sectional view of one embodiment of a monitoring device 104 that may be installed within a yaw brake assembly 48 in accordance with aspects of the present subject matter. Additionally, FIG. 5 illustrates a magnified, cross-sectional view of the monitoring device 104 shown in FIG. 4. It should be appreciated that the system 100 and monitoring device 104 disclosed herein may generally be utilized with yaw brake assemblies 48 having any suitable configuration known in the art. Thus, it should be appreciated that the configuration of the yaw brake assembly 48 shown in FIG. 3 is only provided as one example of a suitable brake configuration with which the monitoring device 104 may be advantageously used.

As shown, the yaw brake assembly 48 generally includes an outer casing 106 mounted within the bed plate 40 of the nacelle 16, a brake piston 108 movably disposed within the outer casing 106 and a puck or brake pad 102 secured to the bottom of the brake piston 108. The brake piston 108 may generally be configured to be pushed or pressed against a friction surface 112 of the wind turbine 10 such that the brake pad 102 is maintained in frictional engagement with the friction surface 112 as the bedplate 40 and nacelle 16 are rotated about the yaw axis 28. For example, in several embodiments, the brake piston 108 may be configured to be pushed or pressed in the direction of the friction surface 112 in order to maintain a constant frictional force between the brake pad 102 and the friction surface 112. Thus, as the usable width 114 of the brake pad 102 is reduced due to wear, the position of the brake piston 108 within the outer casing 106 may be adjusted downwardly (i.e., in the direction of the friction surface 112) in order to maintain the desired frictional force between the brake pad 102 and the friction surface 112.

It should be appreciated that the illustrated friction surface 112 may generally comprise the surface of any suitable wind turbine component that permits the rotation of the nacelle 16 to be stopped, slowed and/or otherwise controlled upon application of a frictional force against such surface. For example, in one embodiment, the friction surface 112 may comprise a surface of the yaw bearing 42. In another embodiment, the friction surface 112 may comprise a surface of a brake disk 214 (FIGS. 6 and 7) configured to be coupled to the yaw bearing 42.

It should also be appreciated that the brake assembly 48 may generally include any suitable structure and/or means for pushing or pressing the brake piston 108 against the friction surface 112 so that the brake pad 102 is maintained in sliding engagement with the friction surface 112. For example, as shown in the illustrated embodiment, the brake assembly 48 includes a bolt 116 threaded into a corresponding threaded bushing 118 mounted within the outer casing 106. The bolt 116 may generally be configured to apply a downward force against a thrust piece 120 movably disposed with the brake piston 108. The thrust piece 120 may, in turn, be configured to transmit the downward force applied by the bolt 116 to the brake piston 108, thereby pushing the brake piston 108 towards the friction surface 112. For instance, as shown in FIG. 4, a spring and/or other suitable biasing mechanism(s) 122 may be disposed between the thrust piece 120 and the brake piston 108. Accordingly, as the bolt 116 is screwed into the threaded bushing 118, an end 123 of the bolt 116 may apply a downward force against the thrust piece 120, which may be transmitted through the biasing mechanism(s) 122 to the brake piston 108. As a result, the brake piston 108 may be pushed or pressed downwardly, thereby maintaining the brake pad 102 in sliding engagement with the friction surface 112.

In other embodiments, the brake piston 108 may be pushed or pressed within the outer casing 106 against the friction surface 112 using any other suitable means known in the art. For example, the brake piston 108 may be coupled to a hydraulic cylinder, a pneumatic cylinder, an electro-magnetic solenoid or motor, other electro-magnetically actuated devices, and/or any other suitable displacement mechanism or actuation device configured to apply a force against the brake piston 108, thereby pushing or pressing the brake piston 108 in the direction of the friction surface 112.

Referring still to FIGS. 3 and 4, as indicated above, the disclosed system 100 may include a monitoring device 104 installed within the yaw brake assembly 48. In general, the monitoring device 104 may be configured to detect brake pad wear by sensing the position change and/or displacement of a movable component of the yaw brake assembly 48 relative to another component of the yaw brake assembly 48 (e.g., the outer casing 106), a component of the monitoring device 104 and/or the friction surface 112. As used herein, the term "movable component" refers to any component of the yaw brake assembly 48 that is configured to move relative to the friction surface 112 as the brake pad 102 wears. For example, movable components may include yaw brake assembly components that are directly or indirectly attached to the brake pad 102 so that the changes in position or the displacement of such components provide an indication of the reduction in usable width 114 of the brake pad 102. Thus, in the illustrated embodiment, a movable component of the yaw brake assembly 48 may comprise the brake piston 108, as the change in position or displacement of the brake piston 108 within the outer casing 106 provides a direct indication of brake pad wear. In other embodiments, movable components of the yaw brake assembly 48 may include, but are not limited to, components directly attached to the brake piston 108, other components of the yaw brake assembly 48 to which a force is applied in order to maintain the brake pad 102 in frictional engagement with the friction surface 112 (e.g., the locking jaws 206, 208 shown in FIGS. 6 and 7) and/or any other suitable components that may change their position and/or be displaced as a result of brake pad wear.

Thus, in the illustrated embodiment, the monitoring device 104 may be configured to detect brake pad wear by sensing the change in position of the brake piston 108 within the outer casing 106. For example, as shown in FIGS. 4 and 5, the monitoring device 104 may include a housing 124 at least partially mounted within a portion of the yaw brake assembly 48, a rod 126 configured to be displaced relative to the housing 124 and a sensor 128 configured to detect changes in the position and/or the displacement of the rod 126 relative to the housing 124 and/or the friction surface 112. The rod 126 may generally include a first end 130 extending within the housing 124 and a second end 132 extending outwardly from the housing 124 so as to be in contact with a top surface 134 of the brake piston 108. Thus, as the brake pad 102 wears and the brake piston 108 moves downward within the outer casing 106, the rod 126 may be displaced relative to the housing 124 and/or the friction surface 112. The sensor 128 may then detect such change in position and/or displacement in order to provide an indication of the wear occurring on the brake pad 102.

In general, the housing 124 of the monitoring device 104 may be configured to be rigidly mounted within the yaw brake assembly 48 at any suitable location and using any suitable means that allows the second end 132 of the rod 126 to be maintained in contact with a movable component of the yaw brake assembly 48 (e.g., the brake piston 108). For example, as shown in the illustrated embodiment, the housing 124 may be mounted within an opening 136 defined in the threaded bushing 118 at a location directly above the top surface 134 of the brake piston 108. As such, when the housing 124 is installed within the opening 136, the second end 132 of the rod 126 may be in direct contact with the top surface 134.

It should be appreciated that the housing 124 may be rigidly secured within the opening 136 using any suitable means. For example, in one embodiment, the housing 124 may be welded to a portion of the threaded busing 118. In another embodiment, both the opening 136 and an outer surface of the housing 124 may be threaded such that the housing 124 may be screwed into the opening 136. In a further embodiment, suitable fastening mechanisms (e.g., bolts, screws, pins, rivets, brackets and/or the like) may be used to secure the housing 124 within the opening 136. It should also be appreciated that, in one embodiment, the opening 136 may comprise a pre-existing opening of the yaw brake assembly 48. For example, the opening 136 may correspond to a pre-existing inspection port of the yaw brake assembly 48 used to visually inspect the brake assembly 48.

Additionally, in several embodiments, the monitoring device 104 may also include a biasing mechanism 140 (e.g., a spring or other suitable mechanism) mounted within a corresponding channel 142 defined the housing 124. In general, the biasing mechanism 140 may be configured to bias the rod 126 away from the housing 124 such that the second end 132 of the rod 126 is maintained in contact with the brake piston 108 as the brake pad 102 wears. For example, as particularly shown in FIG. 5, the second end 132 may be dimensionally larger than the remainder of the rod 126 (e.g., by having a larger diameter than the remainder of the rod 126) such that the biasing mechanism 140 may be compressed between the second end 132 and an inner surface 144 of the channel 142. However, in alternative embodiments, the biasing mechanism 140 may have any other suitable mounting configuration within the housing 124 that allows it to bias the rod 126 in the direction of the brake piston 108.

Referring still to FIGS. 3 and 4, as indicated above, the sensor 128 of the monitoring device 104 may be generally be configured to detect changes in the position and/or the displacement of the rod 126 relative to the housing 124 and/or the friction surface 112. The sensor 128 may also be configured to be communicatively coupled to the turbine controller 26 such that output signals from the sensor 128 may be transmitted to the turbine controller 26. For example, as shown in the illustrated embodiment, the sensor 128 may be communicatively coupled to the turbine controller 26 through a wired connection, such as by coupling the sensor 128 to the turbine controller 26 through a cable and/or other suitable communication link 146. As such, signals generated by the sensor 128 may be directly transmitted to the turbine controller 26 for subsequent processing. However, in an alternative embodiment, the sensor 128 may be communicatively coupled to the turbine controller 26 through a wireless connection. For instance, the sensor 128 may include or may be coupled to an antenna (not shown) configured to transmit suitable signals to the turbine controller 26 through any suitable wireless communications protocol.

In general, it should be appreciated that the sensor 126 may generally comprise any suitable sensing device known in the art that is configured to detect changes in the position and/or the displacement of the rod 126 relative to the housing 124 and/or the friction surface 112. For example, as particularly shown in FIG. 5, the sensor 128 may comprise an electrical circuit having a switch 148 coupled to the first end 130 of the rod 126. As shown, the switch 148 may be normally open and may be configured to be moved to a closed position after the rod 126 (and, thus, the brake piston 108) has moved a predetermined distance 150, thereby completing the circuit. For instance, in several embodiments, the predetermined distance 150 may be chosen such that the switch 148 is moved to the closed position when the usable width 114 of the brake pad 102 is reduced down to a predetermined pad width, thereby indicating that a particular amount of wear has occurred on the brake pad 102 and/or that the brake pad 102 will need to be replaced immediately or at some time in the future. In other words, closure of the switch 148 may permit suitable signals to be transmitted to the turbine controller 26 to indicate that a maintenance operation may need to be performed on the yaw brake assembly 48. In other embodiments, the predetermined distance 150 may be chosen such that the switch 148 is moved to the closed position when the usable width 114 of the brake pad 102 is reduced down to a pad width at which the yaw brake assembly 48 needs to be adjusted. For instance, closure of the switch 148 may indicate that the bolt 116 of the yaw brake assembly 48 may need to be tightened in order to maintain a desired frictional force between the brake pad 102 and the friction surface 112. It should be appreciated that, in alternative embodiments, the switch 148 may be normally closed and may be configured to be moved to an open position when the rod 126 has moved the predetermined distance 150.

In other embodiments, the sensor 128 of the monitoring device 104 may comprise a position sensor or any other suitable sensor configured to provide data and/or signals associated with the displacement of the rod 126 and/or the position of the rod 126 relative to the housing 124, any other component of the monitoring device 104, the friction surface 112 and/or any component of the yaw brake assembly 48. In such an embodiment, the displacement and/or position data/signals may be periodically captured and transmitted to the turbine controller 26 to allow for continuous monitoring of the wear occurring on the brake pad 102. For example, displacement and/or position measurements captured by the sensor 128 may be stored within and analyzed by the turbine controller 26 to evaluate wear trends of the brake pads 102 and/or to provide a means for predicting maintenance intervals. Suitable position sensors may include, but are not limited to, linear displacement sensors, proximity sensors, linear potentiometers, string potentiometers, position transducers, linear position sensors, laser position sensors, gage sensors and/or other contact and non-contact position sensors.

It should be appreciated that, by actively monitoring brake pad wear using the monitoring device 104 and by transmitting appropriate signals to the turbine controller 26, the turbine controller 26 may be configured to notify a wind turbine operator and/or the turbine monitoring system of the wind turbine 10 when one or more of the brake pads 102 need to be replaced and/or when any other suitable maintenance operation needs to be performed on one or more of the yaw brake assemblies. For example, the turbine controller 26 may be provided with suitable computer-readable instructions that configure the controller 24 to generate a message signal when, based on the signals received from the sensor 128, it is determined that the usable width 114 of a brake pad 102 has worn down to a point at which the brake pad 102 needs to be replaced or the brake assembly 48 needs to be adjusted. Thus, in the illustrated embodiment, the turbine controller 26 may be configured to generate a message signal upon closure of the switch 148, thereby indicating that the brake pad 102 has undergone a predetermined amount of wear. The message signal may then be transmitted by the turbine controller 26 to a wind turbine operator or the turbine monitoring system to indicate that a maintenance operation needs to be performed and/or scheduled. For example, in one embodiment, the message signal may be transmitted to a suitable computer or control panel and displayed to the wind turbine operator as a message window on the computer's display screen or a flashing light on the control panel.

Referring now to FIGS. 6 and 7, another embodiment of a system 200 for actively monitoring wear on a brake pad 202 of the wind turbine 10 is illustrated in accordance with aspects of the present subject matter. In particular, FIG. 6 illustrates a perspective view of another embodiment a yaw brake assembly 204 in which the disclosed monitoring devices 104 may be advantageously used in accordance with aspects of the present subject matter. Additionally, FIG. 7 illustrates a cross-sectional view of the brake assembly 204 and monitoring devices 104 shown in FIG. 6 taken along line 7-7. As indicated above, the system 100, 200 and monitoring devices 104 disclosed herein may be utilized with yaw brake assemblies 48, 204 having any suitable configuration known in the art. Thus, it should be appreciated that the configuration of the yaw brake assembly 204 shown in FIGS. 6 and 7 is simply provided as another example of a brake configuration with which the monitoring device 104 may be used.

As shown, the yaw brake assembly 204 includes a top clamping jaw 206 and a bottom clamping jaw 208 movable relative to opposed friction surfaces 210, 212 of the wind turbine 10. For example, in one embodiment, the friction surfaces 210, 212 may be defined by opposing surfaces of a brake disk 214 of the wind turbine 10. Additionally, the yaw brake assembly 204 may include a plurality of brake pads 202 mounted to an inner surface 216 of each clamping jaw 206, 208. In general, the clamping jaws 206, 208 may be configured to be actuated relative to the friction surfaces 210, 212 such that each brake pad 202 is maintained in frictional engagement with one of the friction surfaces 210, 212. Thus, as the usable width 218 of each brake pad 202 is reduced due to wear, the position of the clamping jaws 206, 208 relative to the friction surfaces 210, 212 may be adjusted in order to maintain a constant frictional force between the brake pads 202 and the friction surfaces 210, 212.

It should be appreciated that the clamping jaws 206, 208 may generally be configured to be actuated relative to the friction surfaces 210, 212 using any suitable means. For example, in one embodiment, the yaw brake assembly 204 may include suitable hydraulic and/or pneumatic devices (e.g. suitable cylinders) for moving the clamping jaws 208, 208 relative to the friction surfaces 210, 212. In other embodiments, the yaw brake assembly 204 may include any other suitable actuating and/or clamping means known in the art.

Referring still to FIGS. 6 and 7, the illustrated system 200 may also use one or more monitoring devices 104 installed within the yaw brake assembly 204. For example, as shown in the illustrated embodiment, each clamping jaw 206, 208 includes a single monitoring device 104 installed therein. However, in other embodiments, multiple monitoring devices 104 may be installed within each clamping jaw 206, 208. Alternatively, a single monitoring device 104 may be installed in either the top clamping jaw 206 or the bottom clamping jaw 208.

In general, the monitoring devices 104 shown in FIGS. 6 and 7 may be configured the same as or similar to the monitoring device 104 described above with reference to FIGS. 4 and 5. Thus, each monitoring device 104 may include a housing 124 at least partially mounted within a portion of the yaw brake assembly 204. For example, as shown, the housings 124 may be mounted within openings 220 defined through the clamping jaws 206, 208. Additionally, each monitoring device 104 may include a rod 126 configured to be displaced relative to the housing 124, a sensor 128 configured to detect changes in the position and/or the displacement of the rod 126 relative to the housing 124 and a biasing mechanism 140 configured to bias the rod 126 away from the housing 124. However, unlike the embodiments described above, the second end 132 of each rod 126 may be configured to extend outwardly from the housing 124 so as to be in contact with one of the friction surfaces 210, 212. Thus, as the brake pads 202 wear and the clamping jaws 206, 208 are actuated in the direction of the friction surfaces 210, 212, the position of the rods 124 relative to the housings 124 may change. The sensors 128 may then detect such changes and transmit an appropriate signal to the turbine controller 26 to provide an indication of the wear occurring on the brake pads 202.

For example, similar to the embodiments described above, each sensor 128 may comprise a normally open switch 140 coupled to the first end 130 of each rod 126. Thus, as the clamping jaws 206, 208 are moved inwardly towards the friction surfaces 210, 212 as the brake pads 202 wear, the switch 140 may be moved to the closed position, thereby indicating that it is time to replace the brake pads 202 and/or perform a maintenance operation on the yaw brake assembly 204. Alternatively, each sensor 128 may comprise a position sensor or any other suitable sensor configured to provide data and/or signals associated with the displacement of each rod 126 and/or the position of each rod 126 relative to each housing 124, any other component of the monitoring device 104, and/or any component of the yaw brake assembly 204.

It should be appreciated that, as an alternative to using the disclosed monitoring devices 104, the wear on the brake pads 102, 202 of the wind turbine 10 may be monitored using any other suitable means known in the art. For example, FIG. 8 illustrates a variation of the embodiment of the system 100 shown in FIGS. 4 and 5. As shown, instead of the monitoring device 104 described above, one or more position sensors 300 may be mounted within the yaw brake assembly 48 (e.g., in the opening 136 defined through the threaded bushing 118) such that the position and/or displacement of the brake piston 108 (or any other movable component of the yaw brake assembly 48) relative to the sensor 300 may be monitored. Signals associated with the position and/or displacement of the brake piston 108 may then be transmitted from the sensor 300 to the turbine controller 26 to provide an indication of the amount of wear that has occurred on the brake pad 102. Such a configuration may similarly be utilized within the brake assembly 204 illustrated in FIGS. 6 and 7 to allow the position of the friction surface(s) 210, 212 relative to the sensor 300 to be measured. As indicated above, suitable position sensors 300 may include, but are not limited to, linear displacement sensors, proximity sensors, linear potentiometers, sting potentiometers, position transducers, linear position sensors and laser position sensors, gage sensors and/or other contact and non-contact position sensors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring wear on a brake pad of a wind turbine, the system comprising:
   a brake assembly coupled to a bedplate of the wind turbine, the brake assembly comprising:
   an outer casing extending at least partially through the bedplate;
   a brake piston movably disposed within the outer casing, the brake piston extending lengthwise between a top surface and a bottom surface; and
   a brake pad coupled to the bottom surface of the brake piston, the brake pad being configured to engage a friction surface of the wind turbine such that, as the brake pad wears, a distance between the friction surface and the bottom surface of the brake piston is reduced; and
   a monitoring device comprising:
   a housing extending within the outer casing;
   a rod extending outwardly from the housing, the rod being configured to contact the top surface of the brake piston such that a position of the rod changes as the brake pad wears; and,
   a sensor configured to detect changes in the position of the rod; and,
   a means for applying a force against the brake piston in the direction of the friction surface, said means comprising:
   a bolt, the bolt being received in a threaded bushing mounted within the outer casing.

2. The system of claim 1, further comprising a biasing mechanism mounted within the housing, the biasing mechanism being configured to bias the end of the rod in a direction towards the top surface of the brake piston.

3. The system of claim 1, further comprising a turbine controller, the sensor being communicatively coupled to the turbine controller.

4. The system of claim 1, wherein the sensor comprises a switch coupled to the rod, the switch being configured to open or close as the position of the rod changes.

5. The system of claim 1, wherein the sensor comprises a position sensor.

6. The system of claim 1, wherein the friction surface comprises a yaw bearing of the wind turbine.

7. The system of claim 1, wherein at least a portion of the housing is mounted within the threaded bushing.

8. The system of claim 7, further comprising a thrust piece movably disposed within the brake piston, the bolt being configured to apply a force against the thrust piece in the direction of the friction surface, the force being transmitted through the thrust piece and into the brake piston.

9. The system of claim 8, further comprising a biasing mechanism disposed between the thrust piece and the brake piston.

* * * * *